(12) United States Patent
Moriyama

(10) Patent No.: US 11,387,754 B2
(45) Date of Patent: Jul. 12, 2022

(54) CONTROL DEVICE AND MOTOR DRIVE SYSTEM

(71) Applicants: Kabushiki Kaisha Toshiba, Tokyo (JP); Toshiba Electronic Devices & Storage Corporation, Tokyo (JP)

(72) Inventor: Katsutoshi Moriyama, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 5 days.

(21) Appl. No.: 17/012,703

(22) Filed: Sep. 4, 2020

(65) Prior Publication Data

US 2021/0083608 A1  Mar. 18, 2021

(30) Foreign Application Priority Data

Sep. 17, 2019  (JP) .............................. JP2019-168597

(51) Int. Cl.
*H02P 8/38* (2006.01)

(52) U.S. Cl.
CPC ....................................... *H02P 8/38* (2013.01)

(58) Field of Classification Search
CPC .......... H02P 8/00; H02P 6/10; H02M 5/2935; H02M 1/00
See application file for complete search history.

(56) References Cited

U.S. PATENT DOCUMENTS

| 8,810,185 | B2 * | 8/2014 | Hioki ...................... H02P 6/187 318/685 |
| 9,871,485 | B2 | 1/2018 | Kimura et al. |
| 2014/0042940 | A1 * | 2/2014 | Pollock .................... H02P 6/15 318/400.04 |
| 2017/0194886 | A1 * | 7/2017 | Dwersteg ............ H02P 23/0004 |
| 2018/0375451 | A1 * | 12/2018 | Sugiura ..................... H02P 6/15 |
| 2019/0058424 | A1 | 2/2019 | Ito |

FOREIGN PATENT DOCUMENTS

| JP | H06-095743 A | 4/1994 |
| JP | 2011-067063 A | 3/2011 |
| JP | 2011-139583 A | 7/2011 |
| JP | 5963452 B2 | 8/2016 |
| JP | 2016-220469 A | 12/2016 |
| JP | 2019-037087 A | 3/2019 |

\* cited by examiner

*Primary Examiner* — Said Bouziane
(74) *Attorney, Agent, or Firm* — Allen & Overy LLP

(57) ABSTRACT

According to one embodiment, there is provided a control device including a determination unit, a correction unit and a drive controller. The determination unit determines whether a phase of a rotor of a stepping motor is ahead of or behind a target phase. The correction unit selects a correction value for a control value of a drive current of the stepping motor from among a plurality of correction values based on a determination result. The drive controller corrects the control value of the drive current with the selected correction value to drive the stepping motor.

18 Claims, 8 Drawing Sheets

| COUNT IN SAME DIRECTION | ONCE | TWICE | THREE TIMES | FOUR TIMES | FIVE TIMES | SIX TIMES | SEVEN TIMES | EIGHT TIMES | NINE TIMES | TEN TIMES | ELEVEN TIMES OR MORE |
|---|---|---|---|---|---|---|---|---|---|---|---|
| CURRENT AMOUNT INCREASE [M] | 1 | 1 | 1 | 2 | 4 | 8 | 16 | 32 | 64 | 128 | 256 |

| COUNT IN SAME DIRECTION | ONCE | TWICE | THREE TIMES | FOUR TIMES | FIVE TIMES | SIX TIMES | SEVEN TIMES | EIGHT TIMES | NINE TIMES | TEN TIMES | ELEVEN TIMES OR MORE |
|---|---|---|---|---|---|---|---|---|---|---|---|
| CURRENT AMOUNT INCREASE (M1, STEADY SPEED) | 1 | 1 | 1 | 2 | 4 | 8 | 16 | 32 | 64 | 128 | 256 |

| COUNT IN SAME DIRECTION | ONCE | TWICE | THREE TIMES | FOUR TIMES | FIVE TIMES | SIX TIMES | SEVEN TIMES | EIGHT TIMES | NINE TIMES | TEN TIMES | ELEVEN TIMES OR MORE |
|---|---|---|---|---|---|---|---|---|---|---|---|
| CURRENT AMOUNT INCREASE (M2, ACCELERATING STATE) | 1 | 2 | 4 | 8 | 16 | 32 | 64 | 128 | 256 | 256 | 256 |

US 11,387,754 B2

CONTROL DEVICE AND MOTOR DRIVE SYSTEM

CROSS-REFERENCE TO RELATED APPLICATIONS

This application is based upon and claims the benefit of priority from Japanese Patent Application No. 2019-168597, filed on Sep. 17, 2019; the entire contents of which are incorporated herein by reference.

FIELD

Embodiments described herein relate generally to a control device and a motor drive system.

BACKGROUND

In a control device of a stepping motor, the stepping motor is driven by supplying a generated drive current. At this time, it is desired to suppress step-out of the stepping motor with respect to a change in load.

BRIEF DESCRIPTION OF THE DRAWINGS

FIGS. 8A and 8B are views illustrating a data structure of correction information in the third modification of the embodiment.

DETAILED DESCRIPTION

In general, according to one embodiment, there is provided a control device including a determination unit, a correction unit and a drive controller. The determination unit determines whether a phase of a rotor of a stepping motor is ahead of or behind a target phase. The correction unit selects a correction value for a control value of a drive current of the stepping motor from among a plurality of correction values based on a determination result. The drive controller corrects the control value of the drive current with the selected correction value to drive the stepping motor.

Exemplary embodiments of a control device will be explained below in detail with reference to the accompanying drawings. The present invention is not limited to the following embodiments.

EMBODIMENT

Figure 1:
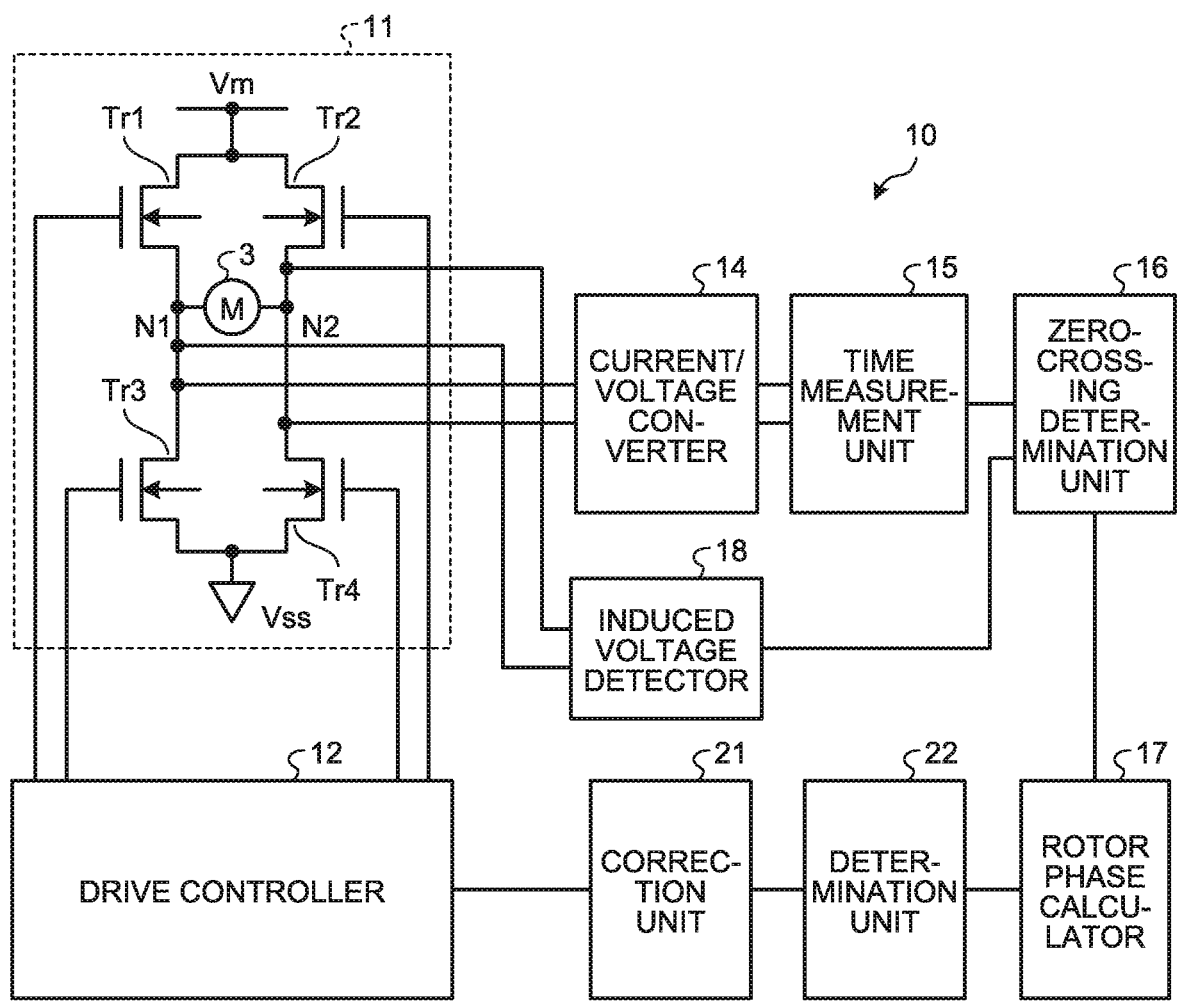
FIG. 1 is a configuration diagram of a control system including a control device according to an embodiment.

FIG. 1 is a configuration diagram of a motor drive system. The motor drive system includes a stepping motor 3 and a control device 10. The control device 10 generates a drive current and controls driving of the stepping motor 3.

The control device 10 includes an H-bridge circuit 11, a drive controller 12, a current-voltage converter 14, a time measurement unit 15, a zero-crossing determination unit 16, a rotor phase calculator 17, and an induced voltage detector 18. The stepping motor 3 has a rotor (not illustrated) including a plurality of magnetic poles and a stator including windings (a plurality of coils) of a plurality of phases. FIG. 1 illustrates a configuration corresponding to a one-phase winding. Regarding the configuration corresponding to windings of other phases, a configuration of a control device other than the drive controller 12 is additionally required. Such a configuration is not illustrated here to simplify the description.

The H-bridge circuit 11 is electrically connected to the stepping motor 3. The H-bridge circuit 11 supplies a drive current (motor current) Imc to the stepping motor 3 under the control of the drive controller 12. The H-bridge circuit 11 includes high-side transistors Tr1 and Tr2 and low-side transistors Tr3 and Tr4. Each of the transistors Tr1 to Tr4 is, for example, an NMOS transistor. The transistor Tr1 has a source connected to one end (node N1) of the stepping motor 3, a drain connected to a power supply voltage Vm, and a gate connected to the drive controller 12. The transistor Tr2 has a source connected to the other end (node N2) of the stepping motor 3, a drain connected to the power supply voltage Vm, and a gate connected to the drive controller 12. The transistor Tr3 has a source connected to a ground potential Vss, a drain connected to one end of the stepping motor 3, and a gate connected to the drive controller 12. The transistor Tr4 has a source connected to the ground potential Vss, a drain connected to the other end of the stepping motor 3, and a gate connected to the drive controller 12.

The H-bridge circuit 11 has a first operating state, a second operating state, and a third operating state. In the first operating state, the transistors Tr1 and Tr4 are maintained in the on-state, and the transistors Tr2 and Tr3 are maintained in the off-state. As a result, a current is supplied from the power supply voltage Vm to the stepping motor 3 via the transistor Tr1 and the node N1. In the second operating state, the transistors Tr2 and Tr3 are maintained in the on-state, and the transistors Tr1 and Tr4 are maintained in the off-state. As a result, a current is supplied from the power supply voltage Vm to the stepping motor 3 via the transistor Tr2 and the node N2. In the third operating state, the transistors Tr1 and Tr2 are maintained in the off-state, and the transistors Tr3 and Tr4 are maintained in the on-state. As a result, an electric charge accumulated in a coil of the stepping motor 3 is discharged and a current flows to the ground potential Vss. The third operating state is also called slow decay.

Figure 2A:
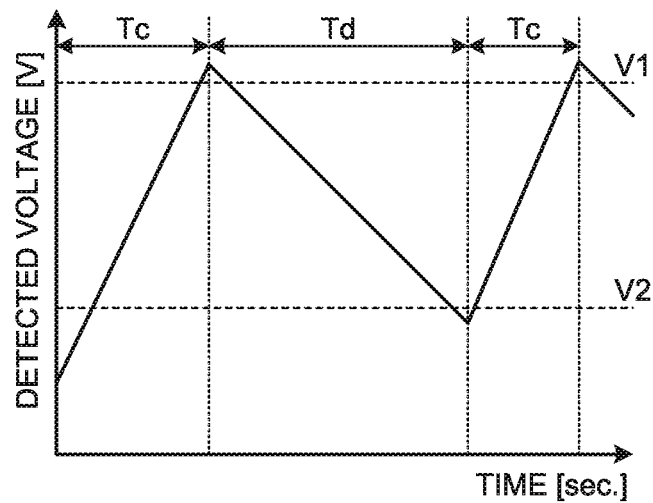
FIGS. 2A to 2C are views illustrating a process of determining a zero-crossing position of an induced voltage in the embodiment.

When the transistors Tr1 and Tr2 are turned off and the transistors Tr3 and Tr4 are turned on, the current-voltage converter 14 converts the current flowing from the stepping motor 3 side to the transistor Tr3 or Tr4 into a voltage and detects the converted voltage. The current-voltage converter 14 supplies the detected voltage to the time measurement unit 15. FIG. 2A illustrates an example of a change over time of the detected voltage of the current-voltage converter 14. In a period (charge period) Tc during which the motor current Imc is supplied to the stepping motor 3, the detected voltage is boosted to a state of being higher than a reference voltage (first reference voltage) V1 from a state of being lower than a reference voltage (second reference voltage) V2. In a period (discharge period) Td during which the electric charge accumulated in the stepping motor 3 is discharged to the ground potential Vss side, the detected voltage is stepped down from the state of being higher than the reference voltage V1 to the state of being lower than the reference voltage V2. The reference voltage V1 can be experimentally determined as a value lower than a peak on a high voltage side in the detected voltage and close to the peak. The reference voltage V2 can be experimentally determined as a value that is higher than a peak on a low voltage side in the detected voltage and close to the peak.

Figure 2B:
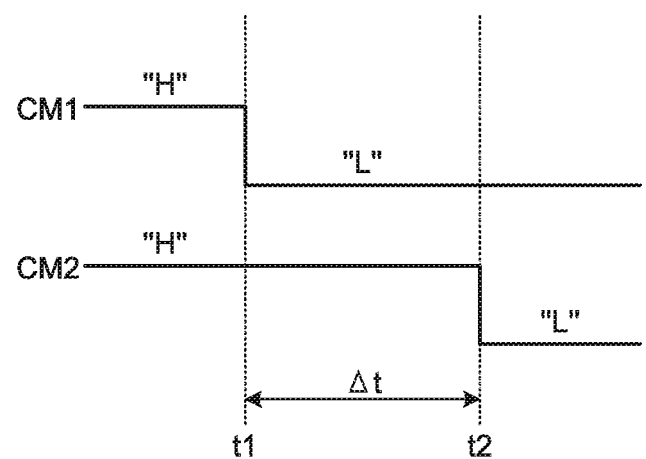

The time measurement unit 15 measures a time when the amount of current changes based on the detected voltage. For example, the time measurement unit 15 generates a result CM1 obtained by comparing the detected voltage and the reference voltage V1, and a result CM2 obtained by comparing the detected voltage and the reference voltage V2. FIG. 2B illustrates an example of a comparison result in the time measurement unit 15. The time measurement unit 15 measures a time difference Δt between a timing t1 when the comparison result CM1 changes from an H level to an L level and a timing t2 when the comparison result CM2 changes from the H level to the L level. This time Δt is a time difference between a first time until the detected voltage exceeds the reference voltage V1 and a second time until the detected voltage further falls below the reference voltage V2 illustrated in FIG. 2A. The time measurement unit 15 supplies the measurement result (time Δt) to the zero-crossing determination unit 16.

Figure 2C:
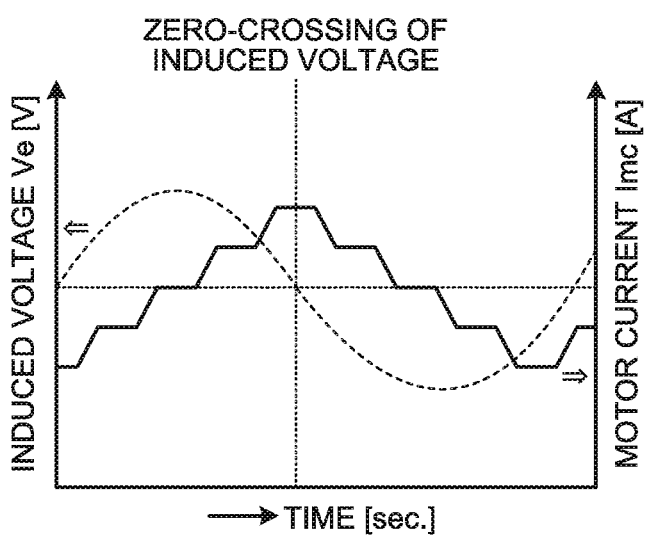

The induced voltage detector 18 detects an induced voltage Ve generated at the both ends of the stepping motor 3. FIG. 2C illustrates an example of changes over time of the induced voltage Ve and the motor current Imc. For example, the induced voltage Ve changes as indicated by the dotted line with respect to the motor current Imc (solid line) flowing in the stepping motor 3. The induced voltage detector 18 supplies the detection result (induced voltage Ve) to the zero-crossing determination unit 16.

The zero-crossing determination unit 16 determines a zero-crossing position of a waveform of the induced voltage based on the time Δt and the induced voltage Ve, and supplies a determination result (zero-crossing position information) to the rotor phase calculator 17. For example, an equivalent equation of the stepping motor 3 is expressed by the following Formula (1):

$$V_3 - Ve = (Rm \times Imc) + \{Lm \times (\Delta i/\Delta t)\} \quad (1)$$

$V_3$ is a power supply voltage applied to the stepping motor 3, Rm is an internal resistance (motor constant) of the stepping motor 3, Lm is an inductance (motor constant) of the coil of the stepping motor 3, and Δi/Δt is a change amount of a control current per unit time.

When the H-bridge circuit 11 changes from the first operating state to the third operating state, the stepping motor 3 is turned into a state of being electrically cut off from the power supply voltage Vm, and $V_3$=0 V, so that Formula (1) can be expressed as:

$$-Ve = (Rm \times Imc) + \{Lm \times (\Delta i/\Delta t)\} \quad (2)$$

Note that the same applies when the H-bridge circuit 11 changes from the second operating state to the third operating state. When transformed, Formula (2) can be expressed as:

$$\Delta t = (Lm \times \Delta i)/[-(Ve + (Rm \times Imc))] \quad (3)$$

At the zero-crossing position of the induced voltage in Formula (3), the induced voltage Ve=0, so that Formula (3) can be expressed as:

$$\Delta t = (Lm \times \Delta i)/[-(Rm_m \times Imc)] \quad (4)$$

Here, Δi is controlled by a ratio (a proportional value A) of the motor current Imc. For example, when controlled by:

$$\Delta i : Imc = A : 1 \quad (5)$$

Formula (4) can be expressed as:

$$\Delta t = (Lm \times A)/[-(Rm)] \quad (6)$$

Since Rm and Lm are constants specific to the motor, it is found that a time position where a value of Δt becomes the value obtained on the right side of Formula (6) is the zero-crossing position of the induced voltage Ve illustrated in FIG. 2C.

The rotor phase calculator 17 receives the determination result (zero-crossing position of the induced voltage) from the zero-crossing determination unit 16 and calculates a rotor phase as a parameter indicating a rotor position. For example, in the induced voltage, a change in a magnetic field of the rotor appears as a voltage, and the magnetic field of the rotor and the induced voltage are shifted in phase by 90 degrees. Therefore, when the zero-crossing position of the induced voltage is detected, an apex position of the magnetic field of the rotor can be detected, and the phase of the rotor can be estimated.

The control device 10 obtains a phase deviation from a target phase (ideal phase) of the rotor, and controls the stepping motor 3 so as to reduce the phase deviation. For example, if the rotor phase is behind the target phase, the control device 10 increases the drive current so as to advance the rotor phase and reduce the phase deviation. If the rotor phase is ahead of the target phase, the control device 10 decreases the drive current so as to delay the rotor phase and reduce the phase deviation. In drive control using this phase deviation, there is a case where step-out which makes it difficult to cause the stepping motor 3 to follow the control occurs since the phase deviation suddenly becomes too large when a load changes abruptly.

In order to suppress the step-out, for example, it is conceivable to detect a rotation amount of the rotor in the stepping motor 3 by a position detection sensor such as an encoder, and to perform PI control or PID control using the detected position information. In these types of control, the phase deviation is obtained from the target phase (ideal phase) of the rotor detected by the position detection sensor. Then, P operation, I operation, and D operation are each performed on the phase deviation, and a corrected current value according to the sum thereof is added to a current control value of the drive current as an operation amount. That is, in the PI control or PID control, complicated arithmetic processing is performed, and adjustment for a long period of time is performed in order to optimize arithmetic parameters according to characteristics of a control system. Therefore, the cost of the control device 10 is likely to increase. In addition, in these types of control, there is a case where step-out which makes it difficult to cause the stepping motor 3 to follow the control occurs since the phase deviation suddenly becomes too large when a load changes abruptly.

Therefore, in the control device 10, the control value of the drive current is corrected with a selected correction value based on the result of determining whether the phase of the rotor is ahead of or behind the target phase in the present embodiment. Specifically, attention is paid to a direction of an error (advancement or delay) of the rotor phase with respect to the ideal phase to select a correction value from among a plurality of candidates according to an error estimation result. Each of the plurality of candidates has a fixed value. The correction value is set to a value M in a direction in which the drive current increases (hereinafter, increasing direction) when the rotor phase is behind the ideal phase or to a value N in a direction in which the drive current decreases (hereinafter, decreasing direction) when the rotor phase is ahead of the ideal phase. When it can be considered that the rotor phase follows the ideal phase, a value 0 without correction may be set. As a result, it is possible to prevent the correction value from becoming too large when the load changes abruptly, and to prevent the occurrence of the step-out.

In addition, in the stepping motor 3, the possibility of the step-out tends to be higher in the case where the rotor phase is ahead than in the case where the rotor phase is behind. Considering this tendency, a relationship between absolute values of the correction values is set as |M|>|N|. As a result, the step-out can be effectively suppressed.

More specifically, the control device 10 further includes a determination unit 22 and a correction unit 21. The determination unit 22 determines whether the rotor phase is ahead of or behind the ideal phase based on the error of the rotor with respect to the target phase. The determination unit 22 supplies the determination result to the correction unit 21. The correction unit 21 selects a correction value for the drive current based on the determination result and supplies the selected correction value to the drive controller 12. The drive controller 12 may perform correction, for example, by adding the correction value to the control value of the drive current. The drive controller 12 controls the drive of the H-bridge circuit 11 with the corrected control value of the drive current. The H-bridge circuit 11 supplies the drive current to the stepping motor 3 according to the control value of the drive current.

Figure 3:
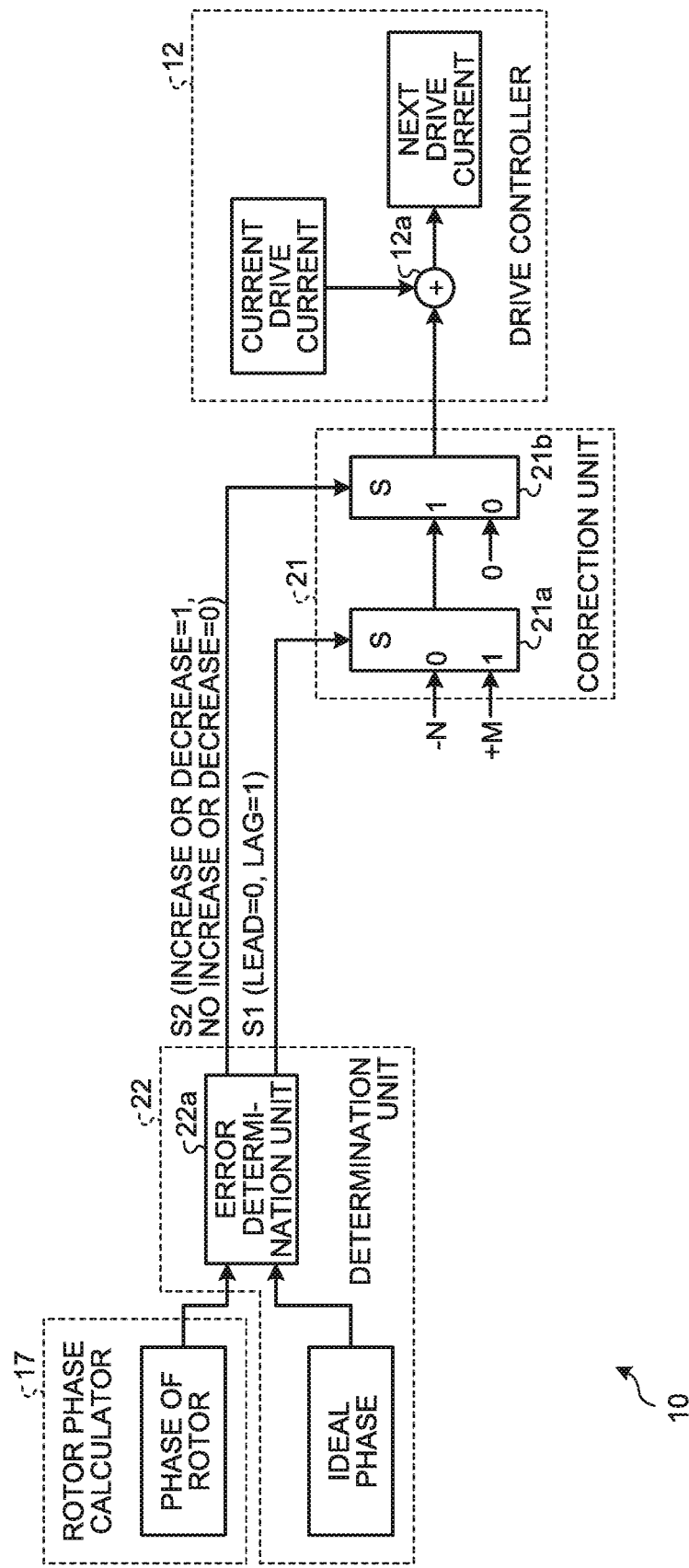
FIG. 3 is a diagram illustrating a configuration of the control device according to the embodiment.

FIG. 3 is a configuration diagram of the control device 10 according to the embodiment. Note that the control device 10 in FIG. 3 illustrates a part of the configuration for the sake of description. For example, the rotor phase calculator 17 obtains the rotor phase based on the zero-crossing position of the induced voltage and supplies the rotor phase to the determination unit 22. The determination unit 22 detects the time from the start of the stepping motor 3 using a timer (not illustrated) or the like. The determination unit 22 holds the ideal phase that is periodically obtained based on waveform information indicating a preset ideal rotor phase and the time from the start. The determination unit 22 has an error determination unit 22a. The error determination unit 22a obtains an error from the ideal phase of the rotor by subtracting the ideal phase from the rotor phase.

In the error determination unit 22a, a predetermined range including zero, and having a threshold on the negative side and a threshold on the positive side is set as an allowable range of the error. The error determination unit 22a generates a signal S1 indicating a direction of the error and a signal S2 indicating the presence or absence of correction based on a result of the comparison between the error and the allowable range, and supplies the signals to the correction unit 21. The correction unit 21 has a selector 21a and a selector 21b. The signal S1 is supplied to a selection node S of the selector 21a, and the signal S2 is supplied to a selection node S of the selector 21b. The correction value (first correction value) N is supplied to an input node "0" of the selector 21a, and the correction value (second correction value) M is supplied to an input node "1" of the selector 21a. An output node of the selector 21a is connected to an input node "1" of the selector 21b. A fixed value 0 without correction is supplied to an input node "0" of the selector 21b.

The error determination unit 22a sets the signal S2 to 0 (=no increase or decrease) if the error falls within the allowable range, and sets the signal S2 to 1 (=increase or decrease) if the error is outside the allowable range. In addition, the error determination unit 22a determines that the rotor phase is ahead of the ideal phase and sets the signal S1 to 0 (=lead) if the error is smaller than the threshold on the negative side, or determines that the rotor phase is behind the ideal phase and sets the signal S1 to 1 (=lag) if the error is larger than the threshold on the positive side.

When the error is outside the allowable range and is smaller than the threshold on the negative side, the selector 21a selects the correction value N and supplies the correction value N to the selector 21b according to the signal S1=0. When the error is outside the allowable range and is larger than the threshold on the positive side, the selector 21a selects the correction value M and supplies the correction value M to the selector 21b according to the signal S1=1. The selector 21b selects an output of the selector 21a and supplies the output to the drive controller 12 according to the signal S2=1. On the other hand, when the error falls within the allowable range, the selector 21b selects the fixed value 0 and supplies the fixed value 0 to the drive controller 12 according to the signal S2=0.

The drive controller 12 has an adder 12a. The adder 12a adds a correction value supplied from the correction unit 21 to the control value of the current drive current and supplies the added value to the H-bridge circuit 11 as the control value of the next drive current. The H-bridge circuit 11 causes the drive current to flow according to the newly supplied control value of the drive current.

As described above, in the control device 10, the control value of the drive current is corrected with a selected correction value based on a result of determining whether the phase of the rotor is ahead of or behind the ideal phase in the present embodiment. As a result, when the load changes abruptly, the drive current is corrected with the fixed value, and thus, it is possible to prevent the correction value from becoming too large and to prevent the occurrence of the step-out. In addition, there is no complicated arithmetic processing such as PID control, and thus, it is possible to eliminate the need for adjustment work for making parameters appropriate. Therefore, it is possible to realize the suppression of the step-out for the abrupt change in load at low cost.

Note that when the lead/lag of the rotor phase and the increase/decrease of the control value of the drive current have a negative correlation, the control device 10 may be configured in accordance therewith. That is, in the control device 10, the correction value of the drive current may be set to the correction value N when the rotor phase is behind the ideal phase, and set to the correction value M when the rotor phase is ahead of the ideal phase. In this case, the correction value M is supplied to the input node "0" of the selector 21a, and the correction value N is supplied to the input node "1" of the selector 21a. Even with such a configuration, when the load changes abruptly, the drive current can be corrected with the fixed value, and thus, it is possible to prevent the correction value from becoming too large and to prevent the occurrence of the step-out.

Alternatively, when the lead/lag of the rotor phase and the increase/decrease of the control value of the drive current have a positive correlation, the correction value M may be changed based on a count that error estimation results are successively obtained in the same direction. The control device 10 may change the correction value to a larger value as the count that the error estimation results are successively obtained in the same direction increases.

Figure 4:
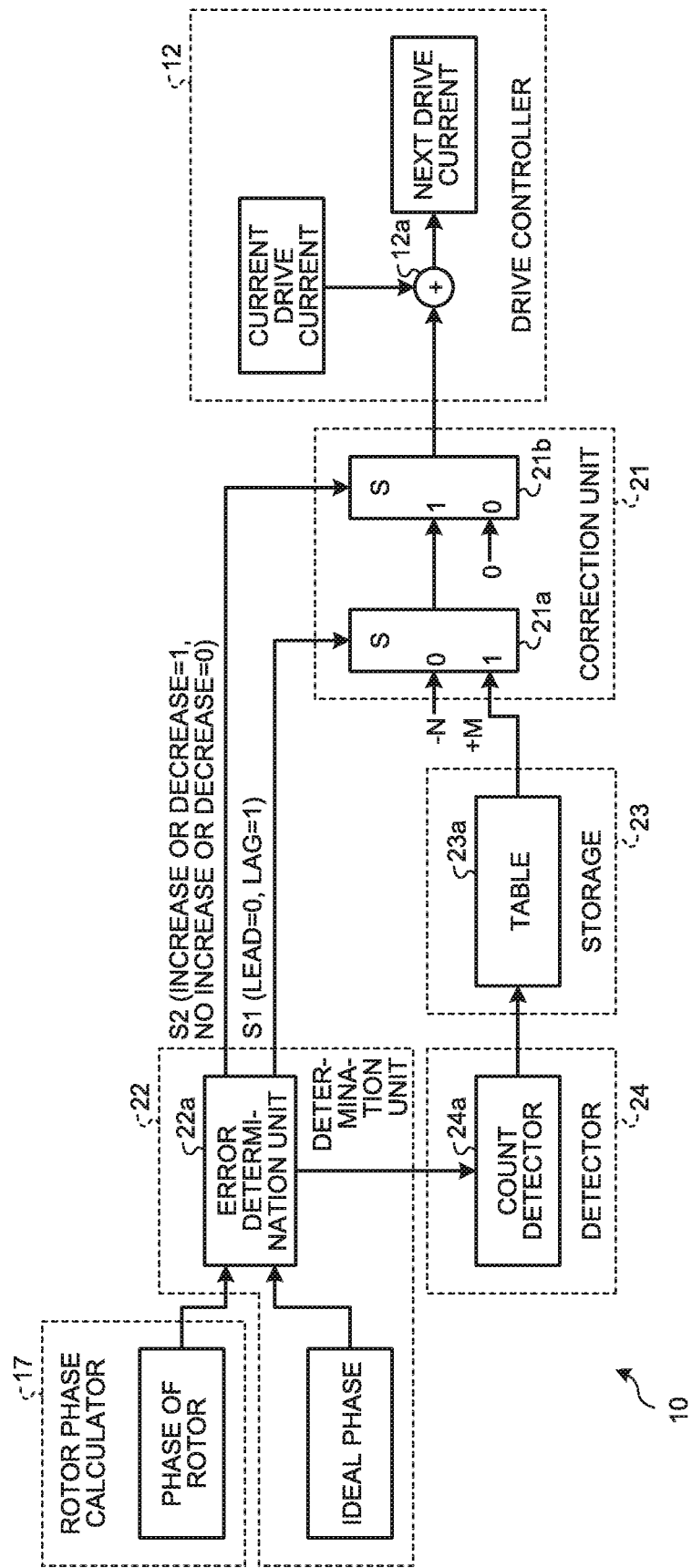
FIG. 4 is a diagram illustrating a configuration of a control device according to a first modification of the embodiment.

FIG. 4 is a diagram illustrating a configuration of the control device 10 according to a first modification of the embodiment. The control device 10 further includes a detector 24 and a storage 23.

The detector 24 detects the count representing the number of times in which difference estimation results are successively obtained in the same direction, and supplies the count value to the storage 23. The detector 24 has a counter (not illustrated) and counts up each time a difference estimation result is obtained in the same direction as a previous estimation result, and resets when the difference estimation result is obtained in a direction different from the previous estimation result.

The storage 23 has correction information in which the count value is associated with the correction value M. The storage 23 refers to the correction information, selects the correction value M according to the count value, and supplies the correction value M to the correction unit 21.

Figure 5:
FIG. 5 is a view illustrating a data structure of correction information in the first modification of the embodiment.

FIG. 5 is a diagram illustrating an example of a data structure of the correction information. In the correction information, the counts representing the number of times in which the difference estimation results are successively obtained in the same direction and a plurality of the correction values M are associated with each other. In the correction information, a larger correction value is associated with a larger count in a stepwise manner. In the correction information of FIG. 5, the correction value (second correction value) M is one when the count is one, the correction value (third correction value) M is two when the count is four. The correction value (fourth correction value) M is 256 when the count is 11 or more. That is, as the count that the error estimation results are successively obtained in the same direction increases, the larger correction value is set. As a result, both the responsiveness to the phase error and the stability to the disturbance can be achieved. Note that $1/256$ of the control range of the drive current is set to 1 in the correction information of FIG. 5, but any fixed value may be used.

Figure 6:
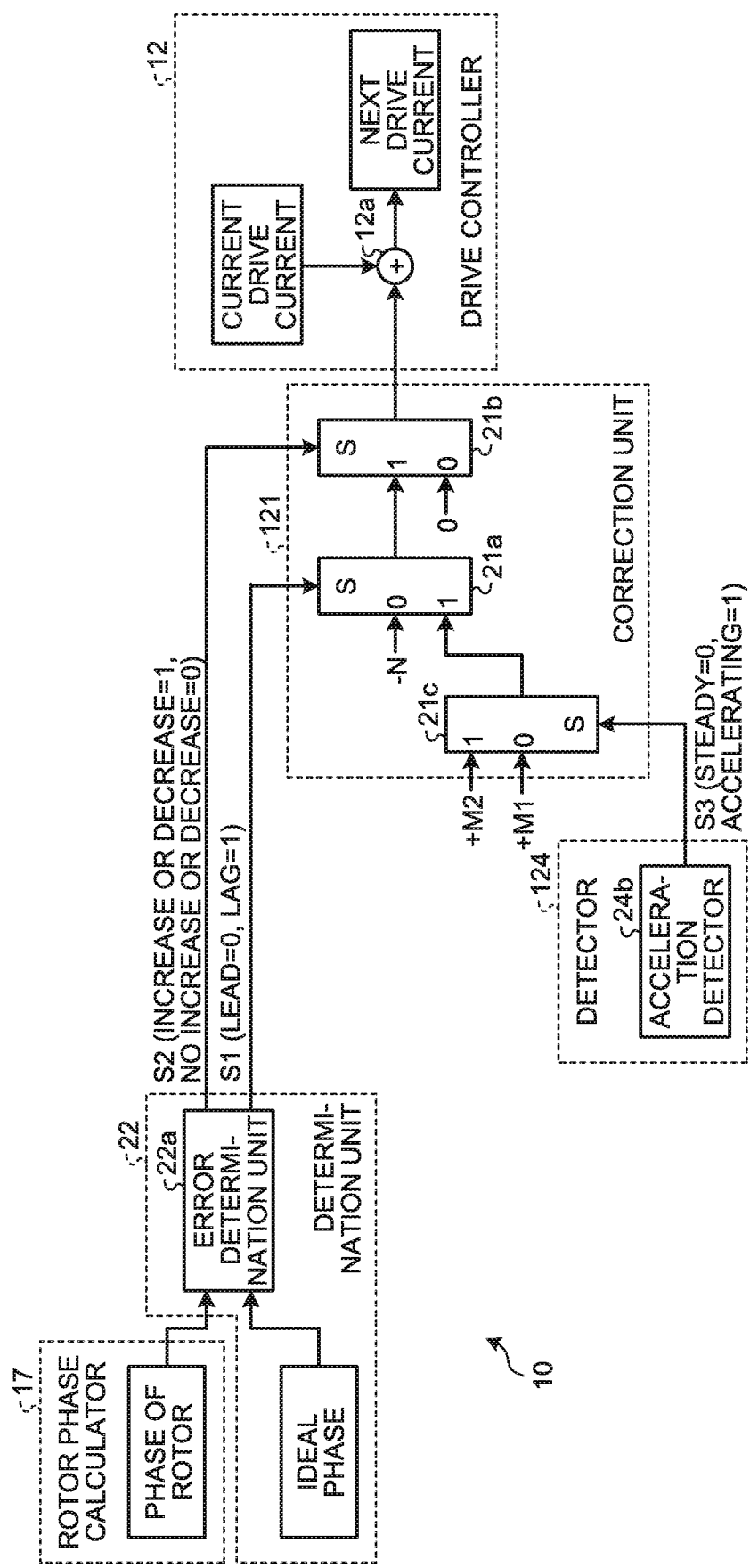
FIG. 6 is a diagram illustrating a configuration of a control device according to a second modification of the embodiment.

FIG. 6 is a configuration diagram of the control device 10 according to a second modification of the embodiment. The control device 10 in FIG. 6 includes a correction unit 121, instead of the correction unit 21 in FIG. 3, and a detector 124 that further includes a selector 21c. The control device 10 operates with a step clock received from the outside or internally generated. The detector 124 measures a cycle of the step clock and detects an accelerating state of rotation of the rotor based on the measurement result. The control device 10 changes the correction value M to a larger value in a case where the rotation of the rotor is in the accelerating state than in a case where the rotation of the rotor is in a steady state.

The detector 124 has an acceleration detector 24b. The acceleration detector 24b has a cycle threshold for the cycle of the step clock. The acceleration detector 24b generates a signal S3 indicating the accelerating state of the rotation of the rotor and supplies the signal S3 to a selection node S of the selector 21c based on a result of the comparison between the measured cycle of the step clock and the cycle threshold.

If the cycle of the step clock is equal to or more than the cycle threshold, the acceleration detector 24b determines that the rotor is in the steady state and sets the signal S3 to '0' (=steady). If the cycle of the step clock is less than the cycle threshold, the acceleration detector 24b determines that the rotation of the rotor is in the accelerating state, and sets the signal S3 to '1' (=accelerating).

In the selector 21c, a correction value M1 is supplied to an input node "0", and a correction value M2 is supplied to an input node "1". The selector 21c selects the correction value M1 or M2 according to the signal S3 and supplies the selected correction value to the input node "1" of the selector 21a. An absolute value of the correction value M2 is larger than an absolute value of the correction value M1. The correction value M1 is selected when the signal S3 is '0', and the correction value M2 is selected when the signal S3 is '1'. As a result, it is possible to suppress the step-out when the speed changes abruptly.

The control device 10 may perform control that is a combination of the control according to the first modification of the embodiment and the control according to the second modification of the embodiment. The control device 10 may change the correction value M to a larger correction value as the count representing the number of times in which the error estimation results are successively obtained in the same direction increases. This correction value may be set to a larger value in a case where the rotation of the rotor is in the accelerating state than in a case where the rotation of the rotor is in the steady state.

Figure 7:
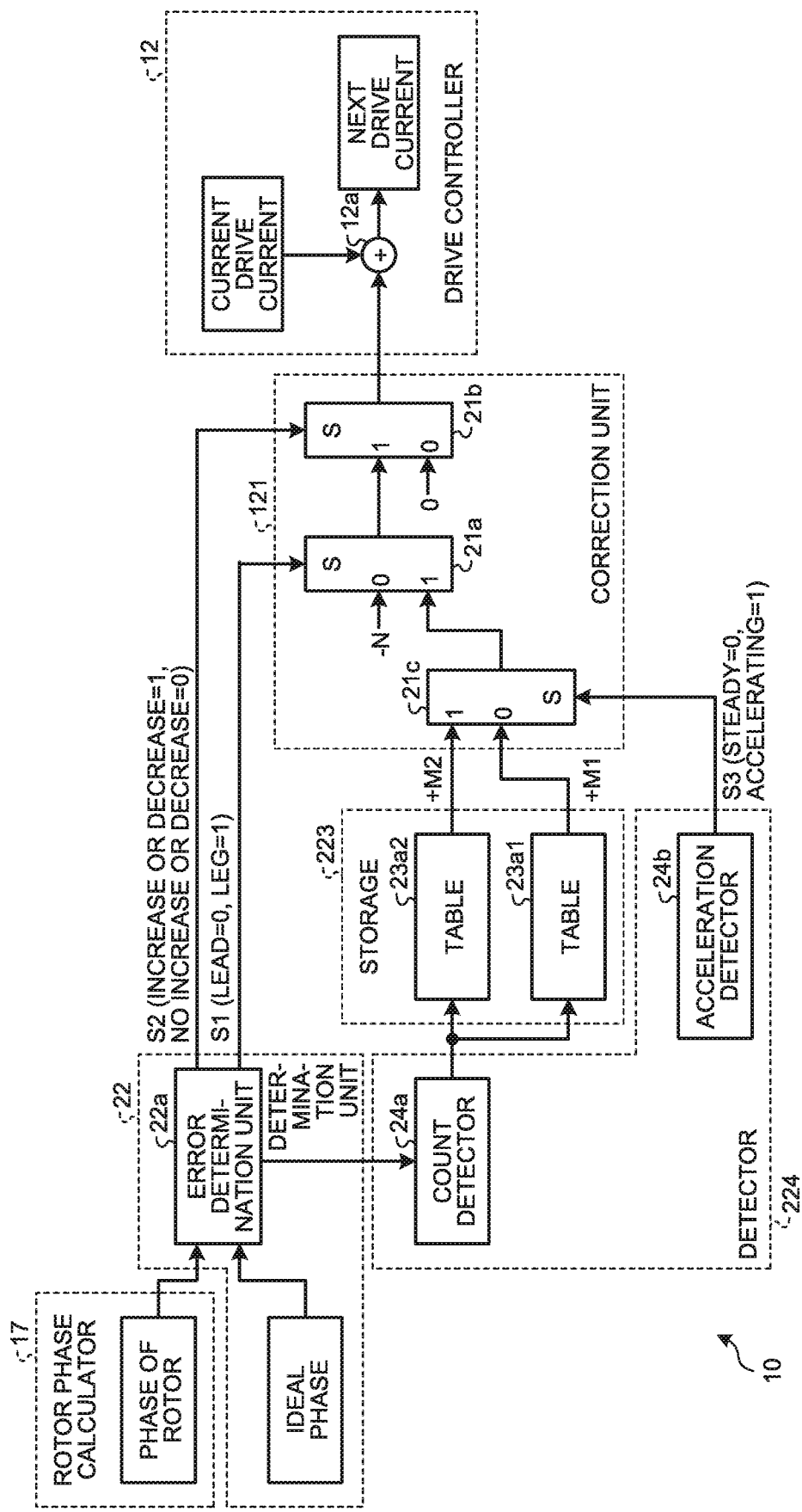
FIG. 7 is a diagram illustrating a configuration of a control device according to a third modification of the embodiment.

FIG. 7 is a configuration diagram of the control device 10 according to a third modification of the embodiment. The correction unit 121 is similar to the correction unit 121 in FIG. 6. A detector 224 is a combination of the detector 24 of FIG. 4 and the detector 124 of FIG. 6, and has a count detector 24a and an acceleration detector 24b. The detector 224 detects the count representing the number of times in which error estimation results are successively obtained in the same direction. In addition, the detector 224 detects an accelerating state of rotation of the rotor according to a result of measuring a cycle of a step clock.

A storage 223 has correction information for a steady state and correction information for the accelerating state, in which the correction values M are associated with the counts representing the number of times in which the error estimation results are successively obtained in the same direction. The storage 23 refers to the two pieces of correction information and selects a correction value based on the count of the detection result from among a plurality of candidates.

FIGS. 8A and 8B are views illustrating examples of data structures of the correction information for the steady state (FIG. 8A) and for the accelerating state (FIG. 8B). Although a larger correction value is associated with a larger count in a stepwise manner in both pieces of the correction information of FIGS. 8A and 8B, a larger correction value is associated with a smaller count in the correction information for the accelerating state (FIG. 8B).

The storage 223 supplies each of the selected correction values M1 and M2 to the correction unit 121. That is, the storage 223 supplies the correction value M1 to the input node "0" of the selector 21c and supplies the correction value M2 to the input node "1" of the selector 21c. The acceleration detector 24b generates the signal S3 indicating the accelerating state of the rotation of the rotor and supplies the signal S3 to the selection node S of the selector 21c.

If the cycle of the step clock is equal to or more than the cycle threshold, the acceleration detector 24b determines that the rotor is in the steady state and sets the signal S3 to '0' (=steady). If the cycle of the step clock is less than the cycle threshold, the acceleration detector 24b determines that the rotation of the rotor is in the accelerating state, and sets the signal S3 to '1' (=accelerating).

In the selector 21c, a correction value M1 is supplied to an input node "0", and a correction value M2 is supplied to an input node "1". The selector 21c selects the correction value M1 or M2 according to the signal S3 and supplies the selected correction value to the input node "1" of the selector 21a. An absolute value of the correction value M2 is larger than an absolute value of the correction value M1. The correction value M1 is selected when the signal S3 is '0', and the correction value M2 is selected when the signal S3 is '1'. As a result, it is possible to suppress the step-out when the speed changes abruptly.

In this manner, the control device 10 changes the fixed value (+M) in the increasing direction to a larger correction value as the count representing the number of times in which the error estimation results are successively obtained in the same direction increases. This correction value is set to a larger value in a case where the rotation of the rotor is in the accelerating state than in a case where the rotation of the rotor is in the steady state. As a result, it is possible to achieve both the responsiveness to the phase error and the stability to the disturbance and to suppress the step-out when the speed changes abruptly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
    a current-voltage converter that converts a current flowing in a stepping motor into a voltage and detects the voltage;
    a time measurement circuit that has a first reference voltage and a second reference voltage lower than the first reference voltage, and measures a first time and a second time, to obtain a difference time between the first time and the second time, the first time being a time until the detected voltage exceeds the first reference voltage, the second time being a time until the detected voltage falls below the second reference voltage;
    a zero-crossing determination circuit that obtains a zero-crossing position of an induced voltage of the stepping motor based on the obtained difference time;
    a rotor phase calculator that obtains a phase of the rotor of the stepping motor based on the zero-crossing position of the obtained induced voltage;
    a determination circuit that compares the calculated phase of the rotor with a target phase to output a first signal indicating whether the phase of a rotor is ahead of or behind the target phase;
    a correction circuit that selects a correction value for a control value of a drive current of the stepping motor from among a plurality of correction values based on a value of the first signal; and
    a drive controller that corrects the control value of the drive current with the selected correction value to drive the stepping motor.

2. The control device according to claim 1, wherein
    the correction circuit selects the second correction value when the phase of the rotor is behind the target phase and rotation of the rotor is not in an accelerating state, and selects a third correction value larger than the second correction value when the phase of the rotor is behind the target phase and the rotation of the rotor is in the accelerating state.

3. The control device according to claim 2, wherein
    an absolute value of the second correction value is larger than an absolute value of the first correction value, and
    an absolute value of the third correction value is larger than the absolute value of the second correction value.

4. The control device according to claim 1, wherein
    an absolute value of the second correction value is larger than an absolute value of the first correction value.

5. The control device according to claim 1, wherein
    the correction circuit selects a first correction value to delay the phase of the rotor when the phase of the rotor is ahead of the target phase, and selects a second correction value to advance the phase of the rotor when the phase of the rotor is behind the target phase.

6. The control device according to claim 5, further comprising a detector that counts, based on a value of the first signal, the number of successive times that the phase of the rotor is determined to be ahead of the target phase successively until the rotor is determined to be behind the target phase or that the phase of the rotor is determined to be behind the target phase successively until the rotor is determined to be ahead of the target phase,
    wherein the correction circuit selects the second correction value when the number of successive times that the phase of the rotor is determined to be behind the target phase is less than a first count, and selects a third correction value larger than the second correction value when the number of successive times that the phase of the rotor is determined to be behind the target phase is the first count or more.

7. The control device according to claim 6, wherein
    the correction circuit selects the third correction value when the number of successive times that the phase of the rotor is determined to be behind the target phase is equal to or more than the first count and less than a second count, and selects a fourth correction value larger than the third correction value when the number of successive times that the phase of the rotor is determined to be behind the target phase is the second count or more.

8. The control device according to claim 7, wherein
    an absolute value of the second correction value is larger than an absolute value of the first correction value,
    an absolute value of the third correction value is larger than the absolute value of the second correction value, and
    an absolute value of the fourth correction value is larger than the absolute value of the third correction value.

9. The control device according to claim 6, wherein
    the correction circuit selects the second correction value when the phase of the rotor is behind the target phase and rotation of the rotor is not in an accelerating state, and selects a third correction value larger than the second correction value when the phase of the rotor is behind the target phase and the rotation of the rotor is in the accelerating state.

10. The control device according to claim 9, wherein
    an absolute value of the second correction value is larger than an absolute value of the first correction value, and
    an absolute value of the third correction value is larger than the absolute value of the second correction value.

11. The control device according to claim 6, wherein
    an absolute value of the second correction value is larger than an absolute value of the first correction value, and an absolute value of the third correction value is larger than the absolute value of the second correction value.

12. The control device according to claim 5, wherein an absolute value of the second correction value is larger than an absolute value of the first correction value.

13. A motor drive system comprising:
a stepping motor; and
the control device according to claim 1 that drives the stepping motor.

14. A control device comprising:
a determination circuit that compares a phase of a rotor of a stepping motor with a target phase to output a first signal indicating whether the phase of the rotor is ahead of or behind the target phase;
a correction circuit that selects a correction value for a control value of a drive current of the stepping motor from among a plurality of correction values based on a value of the first signal;
a drive controller that corrects the control value of the drive current with the selected correction value to drive the stepping motor; and
a detector that counts, based on a value of the first signal, the number of successive times that the phase of the rotor is determined to be ahead of the target phase successively until the rotor is determined to be behind the target phase or that the phase of the rotor is determined to be behind the target phase successively until the rotor is determined to be ahead of the target phase;
wherein the correction circuit selects a first correction value to delay the phase of the rotor when the phase of the rotor is ahead of the target phase, and selects a second correction value to advance the phase of the rotor when the phase of the rotor is behind the target phase,
the correction circuit selects the second correction value when the number of successive times that the phase of the rotor is determined to be behind the target phase is less than a first count, and selects a third correction value larger than the second correction value when the number of successive times that the phase of the rotor is determined to be behind the target phase is the first count or more.

15. The control device according to claim 14, wherein the correction circuit selects the third correction value when the number of successive times that the phase of the rotor is determined to be behind the target phase is equal to or more than the first count and less than a second count, and selects a fourth correction value larger than the third correction value when the number of successive times that the phase of the rotor is determined to be behind the target phase is the second count or more.

16. The control device according to claim 15, wherein an absolute value of the second correction value is larger than an absolute value of the first correction value,
an absolute value of the third correction value is larger than the absolute value of the second correction value, and
an absolute value of the fourth correction value is larger than the absolute value of the third correction value.

17. The control device according to claim 14, wherein an absolute value of the second correction value is larger than an absolute value of the first correction value, and
an absolute value of the third correction value is larger than the absolute value of the second correction value.

18. A motor drive system comprising:
a stepping motor; and
the control device according to claim 14 that drives the stepping motor.

* * * * *